US008525866B2

(12) United States Patent
Erb et al.

(10) Patent No.: US 8,525,866 B2
(45) Date of Patent: Sep. 3, 2013

(54) METHOD AND SYSTEM FOR AUDIO-VIDEO COMMUNICATIONS

(75) Inventors: Paul Andrew Erb, Ottawa (CA); Michael James Conner, Stittsville (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 230 days.

(21) Appl. No.: 12/928,399

(22) Filed: Dec. 10, 2010

(65) Prior Publication Data

US 2012/0147121 A1    Jun. 14, 2012

(51) Int. Cl.
*H04N 7/14* (2006.01)

(52) U.S. Cl.
USPC .................. 348/14.01; 348/14.08; 348/14.12

(58) Field of Classification Search
USPC ............................................. 348/14.01–14.16
See application file for complete search history.

(56) References Cited

U.S. PATENT DOCUMENTS

| | | | |
|---|---|---|---|
| 5,986,703 A | 11/1999 | O'Mahony | |
| 6,593,955 B1 * | 7/2003 | Falcon | 348/14.01 |
| 7,227,567 B1 | 6/2007 | Beck et al. | |
| 2003/0162564 A1 * | 8/2003 | Kimura et al. | 455/556 |
| 2005/0005025 A1 * | 1/2005 | Harville et al. | 709/241 |
| 2006/0017804 A1 | 1/2006 | Lee et al. | |
| 2006/0126894 A1 * | 6/2006 | Mori | 382/103 |
| 2007/0252674 A1 | 11/2007 | Nelson et al. | |
| 2008/0063389 A1 * | 3/2008 | Fang et al. | 396/56 |
| 2008/0068444 A1 * | 3/2008 | Thielman et al. | 348/14.1 |
| 2008/0240517 A1 | 10/2008 | Okamoto | |
| 2009/0315974 A1 * | 12/2009 | Matthews | 348/14.08 |

FOREIGN PATENT DOCUMENTS

| | | |
|---|---|---|
| WO | WO 2004/053795 A2 | 6/2004 |
| WO | WO 2006/003066 A2 | 1/2006 |

OTHER PUBLICATIONS

Tandberg, CISCO "E20 VoIP Video Phone" E20 Product Sheet http://www.tandberg.com/products/tandberg_e20.jsp; Oct 2009.
Jooyoung P. et al. "Facial Image Reconstruction by SVDD-Based Pattern De-noising" Advances in Biometrics Lecture Notes in Computer Science, 2005, 129-135, vol. 3832/2005.
Messaoud M. et al."Efficient Real time Face Tracking Operator Study and Impementation Within Virtex FPGA Technology" The International Arab Journal of IT; Jan. 2007; vol. 4 No. 1.
McCauley, T. "Understanding the Transformation Matrix in Flash 8" http://www.senocular.com/flash/tutorials/transformmatrix/ 2009 1-30.

* cited by examiner

*Primary Examiner* — Melur Ramakrishnaiah

(57) ABSTRACT

A terminal for audio-video communications comprising an IP enabled video phone and a video processor component coupled to the IP enabled video phone and including a module for correcting images from the video camera to render a camera-facing image for transmission to remote viewer. The correcting images may include use of calibrated images for a particular user and may replace background images with neutral images.

12 Claims, 5 Drawing Sheets

METHOD AND SYSTEM FOR AUDIO-VIDEO COMMUNICATIONS

FIELD OF THE INVENTION

The present invention relates to methods and systems for audio-video communications and is particularly concerned with video telephones or teleconferences.

BACKGROUND OF THE INVENTION

With existing video phone technology it is necessary to place a video camera at an appropriate distance from the subject who looks at the camera during the conversation. In the office environment the phone is typically placed at an angle to the user for convenient access while the user is positioned facing a computer terminal and keyboard.

When making a video call using a "normal" video phone the user either turns to speak into the video phone or is shown in profile and appears to be speaking away from the phone. As well, due to the difference in height between the user and the phone, the user is effectively shown speaking overhead unless they tilt their head sufficiently to face the camera directly.

For a laptop or desktop computer with video phone capability, the video camera is typically positioned on the monitor such that a subject looking at a video on the monitor is also looking toward the video camera, at an appropriate distance and viewing angle. This placement is best effort and requires appropriate placement of the monitor relative to the user and the user to face the camera.

In the case of available SIP Video Phones, such as the E20 VoIP Video Phone available from Tandberg, Cisco (http://www.tandberg.com/products/tandberg_e20.jsp) careful positioning of the phone and the user are necessary to provide the appearance that the user is speaking to the far end party.

Alternatively, the user may disregard the video camera placement and appear to not be speaking with the far end party. This may also result in the user moving in and out of focus or leaving the video frame in part or entirely.

With existing video phone technology the image also includes the background and environment of the user including what the user is doing and wearing. This may also include the periphery images around the user and other people who may be passing by or unknowingly entering the camera's field of view. To avoid this from happening, the video phone may be placed in an empty room and/or neutral environment and care is taken about who enters the field of view of the camera.

More typically, the field of view of the video camera is not monitored and the far end party is allowed to observe everything within or entering the field of view.

An alternative is to blur the background image as proposed by Okamoto, Masayoshi (Osaka, JP) in US Patent Publication, 2008/0240517. However, a blurred or distorted image may be distracting to the far-end user. As well, image processing techniques may allow restoration of the original image from a blurred or distorted version.

Systems and methods disclosed herein provide a communications method and system for video telephones or teleconferences to obviate or mitigate at least some of the aforementioned disadvantages.

BRIEF DESCRIPTION OF THE DRAWINGS

The present invention will be further understood from the following detailed description with reference to the drawings in which.

DETAILED DESCRIPTION OF THE PREFERRED EMBODIMENT

An object of the present disclosure is to provide an improved audio-video communications system and method.

Accordingly, the user is shown in focus and facing the far end party even when the user is not directly facing the camera. Face forward images of the user are displayed to the far end party, irrespective of the user's location within the camera viewing area. Images of the user are presented as facing the viewer, regardless of actual angle between camera and the user.

An IP video phone with a top-mounted video camera having a wide angle lens captures a relatively large viewing area. Captured images are sent to a video processing capability over an IP socket connection. When a user is within the viewing area, video processing is performed on periodic video frames to find the user's face, regardless of viewing angle or distance. Video processing is also performed, using image translation and interpolation techniques, to render front view images of the user. The front view images of the subject face are made available for display over an IP socket.

In accordance with an embodiment, calibration for a particular user may be done by placing the camera and video screen where they would be for face forward video calls. The user then faces the camera, ignoring placement of the video screen, and an image is taken of the user. The user then faces the video screen and another image is taken of the user. The user then faces away from the video screen and camera (at an alternative angle) and another image is taken of the user. These images are then processed to derive calibration information specific to the user for use in processing subsequent face forward video calls.

In accordance with another embodiment the background and periphery within the camera area of view is removed from the image. A neutral background is then applied to the camera area of view except for the "subject of focus". The "subject of focus" of the image may be statically or dynamically determined. The neutral background may include predetermined, generated images or video sequences. The neutral background also provides an opportunity for advertising during video calls.

Images from the video camera are sent to a video processing capability over an IP socket connection. Image analysis is applied to find and isolate the "subject of focus". The video processing capability then replaces the image surrounding the "subject of focus" with a neutral background image. The resulting images are made available for display over an IP socket.

Figure 1:
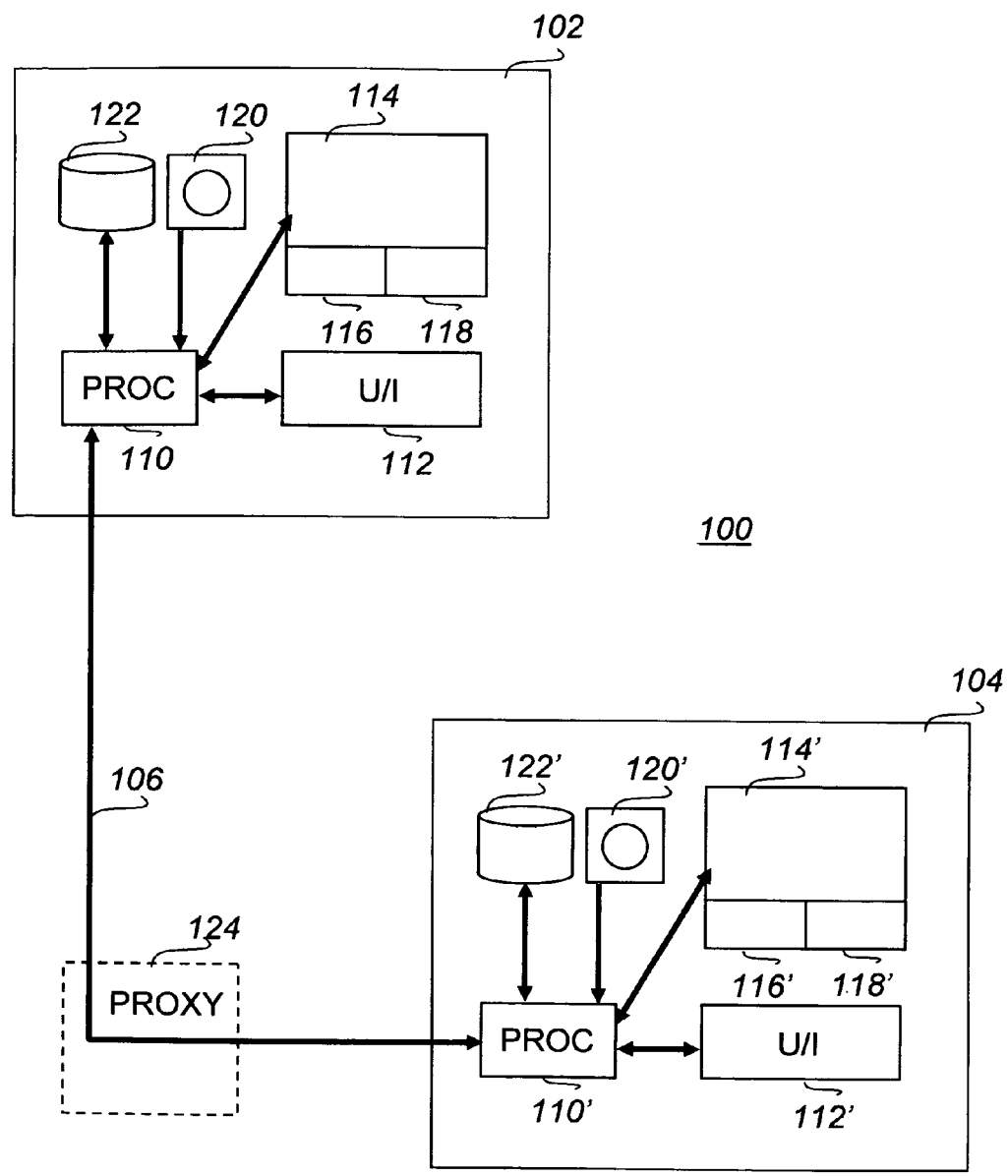
FIG. 1 illustrates an audio-video communications system that is capable of using embodiments of the present disclosure.

Referring to FIG. 1 there is illustrated an audio-video communications system in which embodiments of the present disclosure may be implemented. An audio-video communications system 100 for a two-way video teleconference includes end-user terminals 102 and 104 coupled via a communications link 106. End user equipment 102 includes a video processor component 110, a user interface 112, a display 114, for convenience shown with built in speaker 116 and microphone 118, a video camera device 120 and a storage device 122 all coupled to the processor. The communications link 106 may be a dedicated link or may be implemented via a data communications network, for example via the Internet. The communications link may include a proxy 124. The user interface 112 in the present example is a keypad.

The present description relates to providing IP face forward video phone capability in an office environment. The examples provided may make use of a face forward video processing component within the IP phone or proxy and a user specific video calibration. However, the disclosure is equally applicable to alternative face forward video phone deployments.

Figure 2:
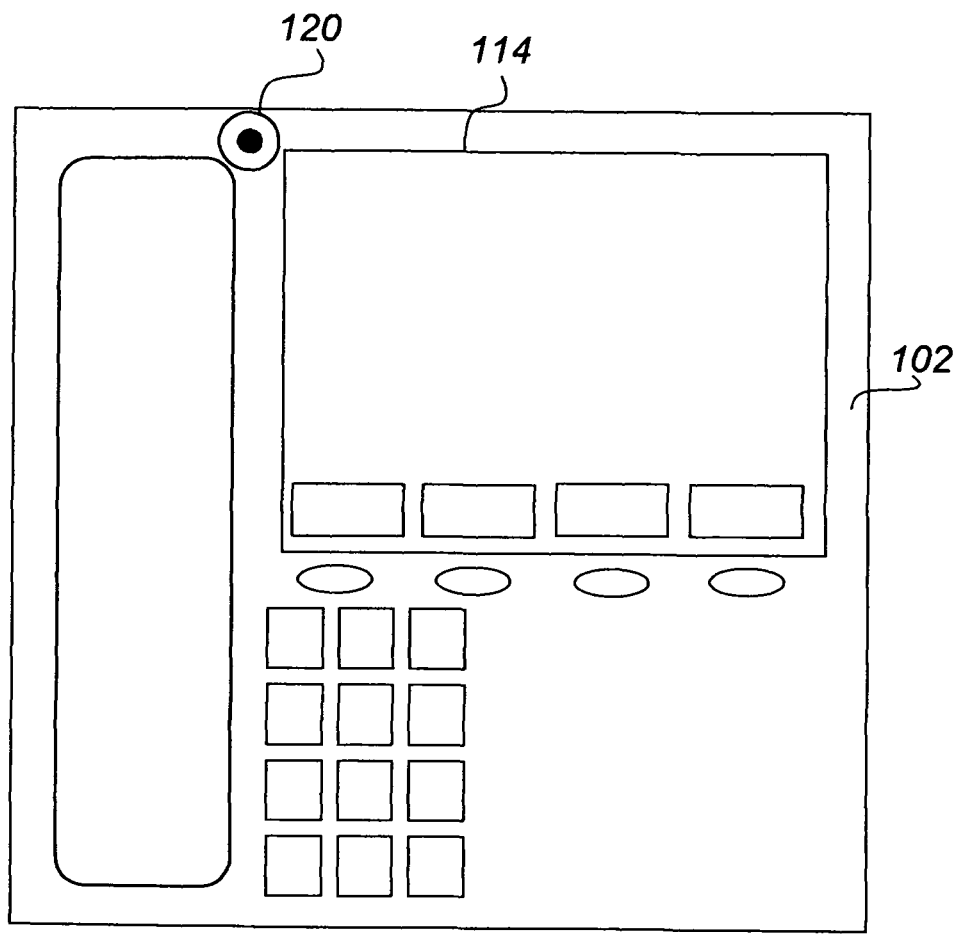
FIG. 2 schematically illustrates an IP video phone that is capable of using embodiments of the present disclosure.

Referring to FIG. 2, there is schematically illustrated an IP video phone that is capable of using embodiments of the present disclosure. The IP video phone 102 has a display 114 and a video camera 120 having a wide angle (or fisheye) lens that is physically mounted proximate the top of the IP video phone to capture a relatively large field of view.

Figure 3:
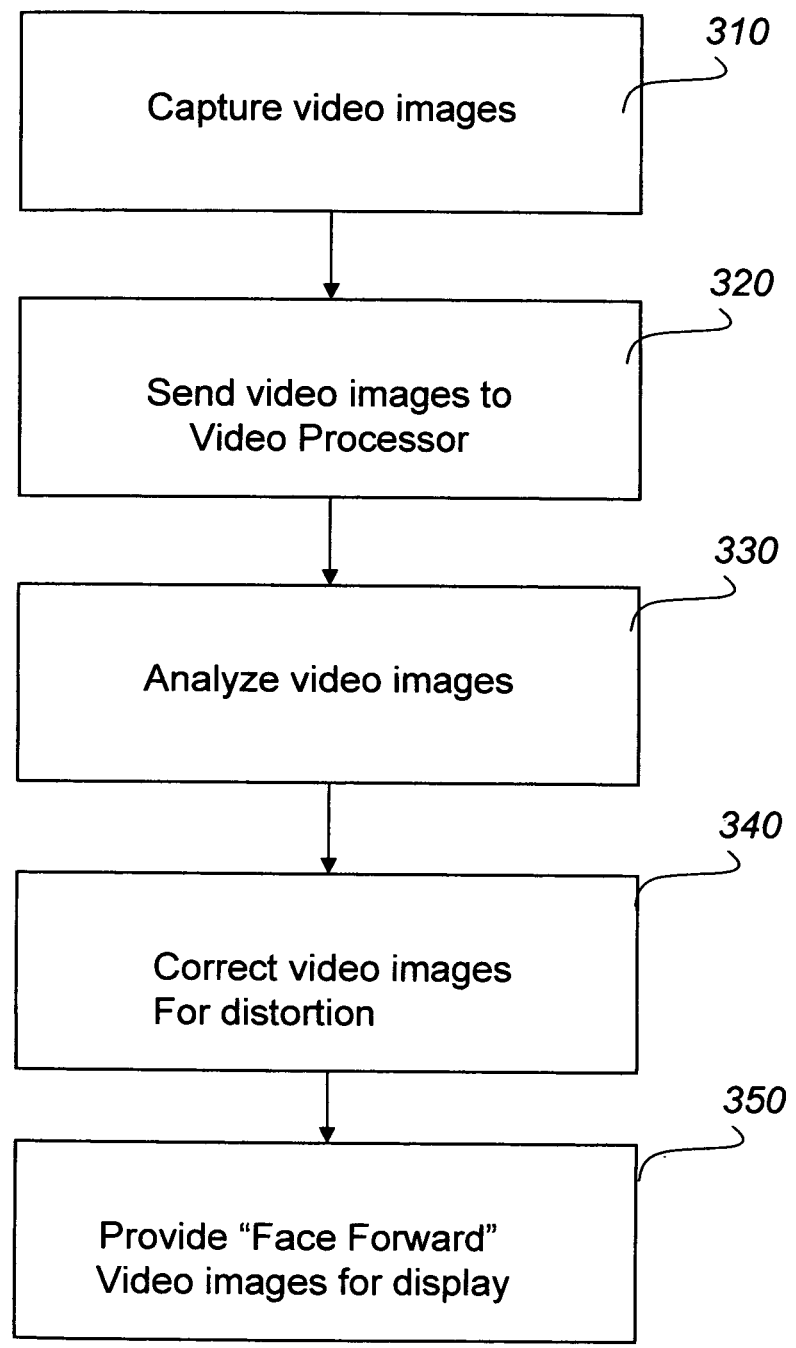
FIG. 3 illustrates in a flow chart a method of image processing in accordance with an embodiment of the present disclosure.

Referring to FIG. 3, there is illustrated in a flow chart a method of image processing in accordance with an embodiment of the present disclosure. Upon a predetermined event, video images are captured 310 and sent 320 over an IP socket to the video processing capability, for example as provided by the face forward video processing component. The resolution and frame rate of the video images used is limited by video processing capability; however, it may also be determined by application or device configuration, the far end device and/or the video call transmission bandwidth.

For this example, the predetermined events are prior to the video call being established, for example during initial call setup and frame rate negotiation. This provides a lead time for the video processing capability to process images of the user prior to providing the rendered video images to the far end for display.

The video processor capability, in the video processing component, performs an analysis 330 on the input stream of video frames. For each frame the following steps are applied, utilizing knowledge of the conversion and transformation factors utilized on prior image frames.

The video processor capability applies conversion algorithm(s) to correct 340 for known image distortion of the camera. This is done using available image correcting techniques (e.g. http://photo.net/learn/fisheye/). Probably the best known panoramic image stitching software, PanoTools™ is in fact a highly versatile set of tools/plug-ins for manipulating all kinds of imagery, not just for stitching.

The video processor capability then uses face locating techniques (e.g. The International Arab Journal of Information Technology, Vol. 4, No. 1, January 2007 article "Efficient Realtime Face Tracking Operator Study and Implementation Within Virtex FPGA Technology, http://www.face-rec.org/ and http://www.ccis2k.org/iajit/PDF/vol. 4,no.1/2-Mostefai.pdf) to find the user's face within the video frame. The techniques used are supplemented by knowledge of the face location in prior frames and the video user calibration information, obtained at a prior configuration stage.

The video processor capability then determines the transformation factors required to change the angle of the face from that of the image to a face forward image using known practices (for instance, Understanding the Transformation Matrix in Flash 8, http://www.senocular.com/flash/tutorials/transformmatrix/).

Interpolation algorithms and the user video calibration image are applied to fill in the face forward image where the camera image is not available (e.g. to fill in the right side of the user's face with the original image is the left profile). Face symmetry and image reconstruction techniques are applied to fill in expression in the absence of more accurate interpolation algorithms (e.g. "Facial Image Reconstruction by SVDD-Based Pattern De-noising", Jooyoung Park, Daesung Kang, James T. Kwok, Sang-Woong Lee, Bon-Woo Hwang and Seong-Whan Lee Advances in Biometrics Lecture Notes in Computer Science, 2005, Volume 3832/2005, 129-135, DOI: 10.1007/11608288_18 http://www.springerlink.com/content/p037627183g244380.

Further analysis is performed as needed by the video processor capability to refine the applicable conversion, transformation and interpolation algorithms and correct for focus and motion of the user.

The video processor capability then renders a front view image 350 of the subject face by applying the image correction, translation and interpolation algorithms to the received image. The rendered image shows the user face forward while the surrounding image and background may be significantly distorted by the video processing. Background exclusion processing is applied to present the user face forward against a neutral background in the resulting image.

The above analysis and rendering is repeated frame by frame until a predetermined event, dropping incoming frames while processing the previous frame. The next frame to be processed is the frame received after analysis and rendering is completed.

The rendered image is then sent over an IP socket to the IP video phone 102 from the face forward video processing component for transmission to, and presentation at, the far end video device.

This description makes use of the face forward video phone in an office environment. More specifically, this example uses the IP face forward video phone with face forward video processing component and supports Bluetooth high-speed video for use with a re-locatable phone display. However, the invention is equally applicable to alternative face forward video deployments.

The IP face forward video phone, with face forward video processing component, is placed in a normal position on the user's desk. The re-locatable phone display is also placed in a normal position on the user's desk for comfortable use.

At the IP video phone, a video calibration user interface can be provided to the user. This interface is associated with the voice first video phone capability and steps the user through an initial setup procedure, on first use of the phone or user initiated.

Figure 4:
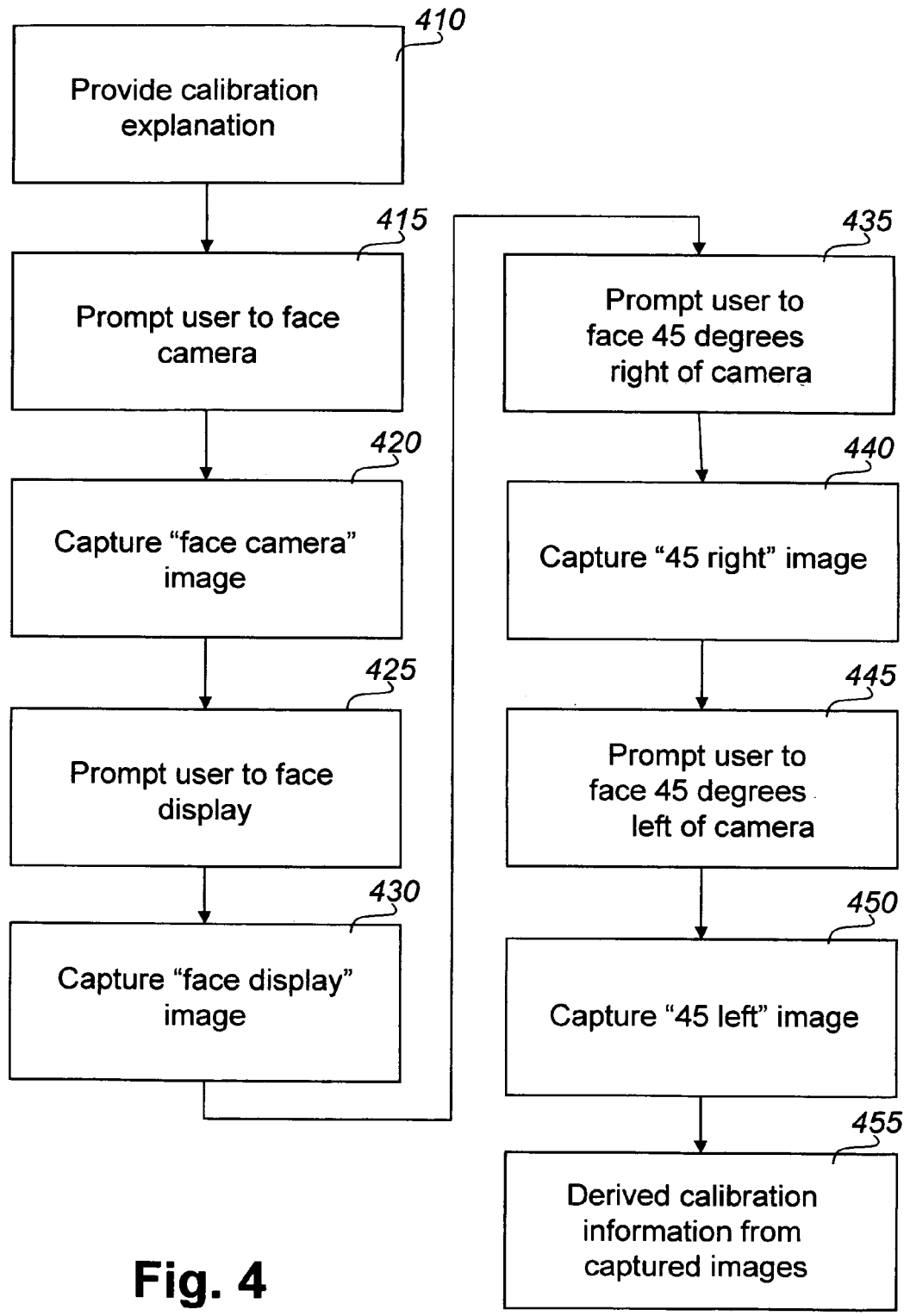
FIG. 4 illustrates in a flow chart a method of image processing in accordance with another embodiment of the present disclosure.

Referring to FIG. 4, there is illustrated in a flow chart a method of image processing in accordance with another embodiment of the present disclosure. The video calibration user interface provides 410 a brief explanation of the calibration procedure and prompts the user for confirmation that the IP phone and video display device are placed in their normal locations and that the lighting level is normal.

The video calibration user interface prompts 415 the user to directly face the camera on the IP phone face forward video phone (located at the top edge of the device) and look into the camera. An option is provided to the user to indicate whether placement of the IP video phone requires adjustment before they can directly face the camera (and the approximate angle of clockwise rotation involved in degrees). The user is also prompted to be within a predetermined minimum and maximum distance from the phone. A similar option is provided to the user to indicate whether placement of the IP video phone requires adjustment for the appropriate distance (and the number of inches/centimeters closer or farther). Upon user acknowledgement an image capture is taken of the subject 420.

The video calibration user interface prompts the user to return the IP video phone to its previous position if an adjustment was required during initial image capture.

The video calibration user interface then prompts the user to directly face the video display device and look into the eyes of the face displayed 425 (using a face forward video rendering of the image taken in the previous step). An option is provided to the user to indicate whether placement of the video display device requires adjustment before they can directly face the image (and the approximate angle of clockwise rotation involved in degrees). Upon user acknowledgement an image capture is taken 430 of the subject.

The video calibration user interface prompts the user to face the camera located at the top edge of the device at an approximate angle of 45° from the right and look into the camera 435. Options are provided to the user as previously identified and, upon user acknowledgement, an image capture is taken 440 of the subject.

The video calibration user interface prompts the user to return the IP video phone to its previous position if an adjustment was required during initial image capture.

The video calibration user interface prompts 445 the user to face the camera on the IP video phone, located at the top edge of the device, at an approximate angle of 45° from the left and look into the camera. Options are provided to the user as previously identified and, upon user acknowledgement, an image capture 450 is taken of the subject.

The video calibration user interface prompts the user to return the IP video phone to its' previous position if an adjustment was required during initial image capture.

Image processing is performed by the face forward video processing component using the captured images to derive the calibration information 455. This can be done either as each image is captured or after all images have been captured. A set of reference points are identified on each image and associated measurements are determined. The reference points include such facial features as eye pupils and lids, cheek prominences, nose, lips and chin. Optionally, transformation algorithms are calculated that would correctly render each image for face forward video and the associated parameters for each transformation algorithm are determined. Additional differences between left and right profiles useful for face forward video image rendering may also be determined and included.

The calibration information is then stored in the IP face forward video phone for subsequent use by the face forward video processing component during face forward video calls. Alternatively, the calibration information is stored for the user in the hosting communication director communications system hosting the IP video phone.

This description relates to providing face forward video phone capability for an IP video phone in an office environment. This example also makes use of a face forward video phone. However, the present disclosure is equally applicable to alternative video phones and deployments.

Figure 5:
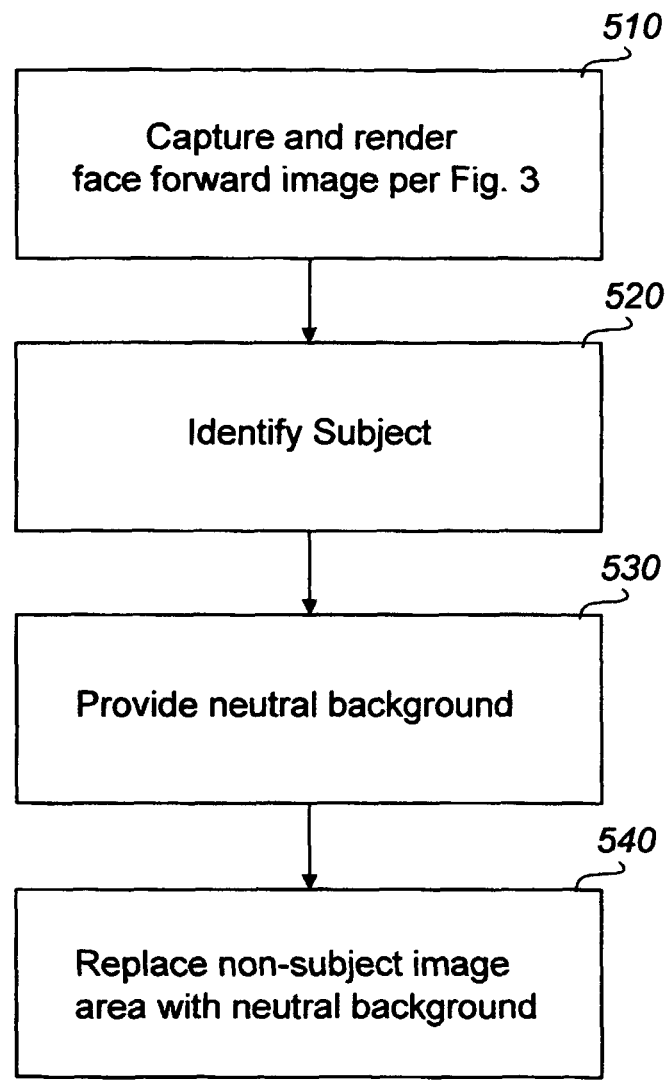
FIG. 5 illustrates in a flow chart a method of image processing in accordance with a further embodiment of the present disclosure.

A video camera with a wide angle lens is physically mounted on an IP video phone to capture a relatively large field of view. This field of view may include both personal and business materials within the immediate office environment, potentially including those of neighboring cubicles. Referring to FIG. 5, there is illustrated in a flow chart a method of image processing in accordance with a further embodiment of the present disclosure. During a face forward video call video images are captured and processed by the video processing capability and associated face forward images are rendered 510, as shown in detail in FIG. 3. As each image is rendered, the "subject of focus" is identified 520 as the user's face by the video processing capability. Alternatively, image processing techniques are applied to determine the perimeter of the "subject of focus" (for example, techniques are described in the related US patent application identified above).

A neutral background image 530 is configured, generated or taken frame by frame from a video sequence appropriate to the setting and/or environment for use during the call. This neutral background image is used throughout the duration of the video call to replace the background and periphery from the camera field of view or associated rendered image.

The image is modified 540 by the video processing capability to replace the content that is not within the "subject of focus" with the corresponding content from the neutral background image. This image modification is performed by pixels, vectors or other available image processing technique, see for example http://en.wikipedia.org/wiki/Image processing.

The above analysis and replacement is repeated frame by frame until a predetermined event.

The modified image is then sent over an IP socket to the face forward video phone for transmission to, and presentation at, the far end face forward video phone.

Video processing may be performed to render more than just the subject face, e.g. including upper torso and arms, render more than one subject within the field of view, or render based on different criteria than subject face. Other angles of view may also be rendered as the invention is not limited to a frontal view.

The video camera may be built in, physically attached or provided by proxy. The video camera may be fixed or swivel to face beside/behind the phone. A still camera may also be utilized, using a series of successive still images. One or more still cameras and/or multiple video cameras may be used in conjunction to capture a wider field of view or different angles of view of the same subject(s). The use of an IP socket for information transfer between camera, video processing capability and display may be replaced by any sufficient information transfer mechanism, e.g. direct memory access.

The frame rate of the rendered image is limited by the video processing capability available. Video processing may be performed in one or more sequential or parallel processing stages, on one or more processing engines, and on one or more hardware platforms. The quality of the rendered image may be degraded or improved based on availability of processing hardware, subscriber service level, call importance, or other factors. The video processing capability is provided by a dedicated server, within the telephone device or by proxy.

Video processing may utilize appropriate optimizations and techniques to reduce processing requirements. The video processing may be initiated after the video call has been established, with an associated delay in the start of video presentation, or at any time before or during a call optionally initiated by the subject or determined by system configuration. Location of a handset or headset device in the video image may also be used to aid video processing.

Video processing for the face search and image rendering may be tuned to use known facial characteristics from the most likely subject(s). User video calibration may also be used to improve the effectiveness of the video processing capability.

Calibration may involve the use of props, accessories or attachments to improve results.

Calibration may be automatically initiated and/or initiated by the user, once only or periodically or as a result of video processing capability determination that the information is incorrect.

Calibration may also be applied to different subject matters (as well as faces).

Multiple calibrations may be taken for a single user to accommodate the wearing of glasses, contacts, fashion accessories, head covering, etc. The choice of calibration to use may be automatic, by user selection or alternative selection method (e.g. time of day).

Any number of images may be used for calibration.

The reference points used to determine calibration information may include any combination of facial features common to the captured images.

Captured video may be utilized for calibration rather than images.

Calibrated information may be captured and stored within a video phone, at a video server, or by proxy.

Video processing may be performed in one or more sequential or parallel processing stages, on one or more processing engines, and on one or more hardware platforms. Video processing may also be performed within the video phone device or by proxy. The quality of the rendered image may be degraded or improved based on availability of processing hardware, subscriber service level, call importance, or other factors.

While specifically applicable to Video Phone devices, the invention can also be used in collaborative systems, e.g. video conferencing, video introduction systems (e.g. apartment lobby camera), or as a stand alone device that stores and forwards the resulting video images.

The invention is also applicable to security surveillance installations where the initial and/or periodic capture of front view image of subject faces supplements the video captured by a surveillance camera.

Another application is where video access is desired to see one's pet at a boarding kennel. Placement of camera and display are affected by the environment. Additionally, the video processing capability face recognition and calibration algorithms may be tailored for the species of pet in the video call.

Video calibration can be applied to face recognition or alternative technologies in security and surveillance monitoring.

While specifically applicable to Face Forward Video Phone devices, the invention can also be used in collaborative systems, e.g. video conferencing, video introduction systems (e.g. apartment lobby camera), or as a stand alone device that stores and forwards the resulting video images.

In security sensitive environments the invention can be applied in part to ensure background and periphery images that may include compromising information are not captured.

This also applies to other collaboration environments involving video cameras and display of the captured images where sensitive information may fall within the field of view of the camera.

Numerous modifications, variations and adaptations may be made to the particular embodiments described above without departing from the scope of the patent disclosure, which is defined in the claims.

What is claimed is:

1. A terminal for audio-video communications comprising:
an IP enabled video phone; and
a video processor component coupled to the IP enabled video phone and including a module for correcting images from a video camera to render a camera-facing image for transmission to a remote viewer, the video processor component being configured to drop at least one image from the video camera while correction and rendering of a previous image from the video camera is performed.

2. The terminal of claim 1, wherein the module for correcting images includes an image distortion correction module.

3. The terminal of claim 1, wherein the module for correcting images includes an image rotation correction module.

4. The terminal of claim 1, wherein the module for correcting images includes a subject of focus identification module.

5. The terminal of claim 1, wherein the module for correcting images includes an image calibration module.

6. The terminal of claim 5, wherein the image calibration module includes an image calibration user interface.

7. The terminal of claim 5, wherein the image calibration module includes a background substitution module.

8. A method of processing images for audio-video communications, the method comprising:
capturing one or more video images;
analyzing the captured images to determine if a correction is required;
applying correction to the captured images to render one or more camera-facing images;
providing the camera-facing images for display; and
dropping at least one captured video image while analyzing, correcting and rendering of a previously captured video image is performed.

9. The method of claim 8, wherein capturing video images includes capturing images with a subject positioned in predetermined orientations with respect to a video camera and deriving calibration information for the subject from the captured images for use in analyzing later captured images.

10. The method of claim 9, wherein the analyzing the captured images uses calibration information.

11. The method of claim 9, wherein the analyzing the captured images includes identifying the subject of interest within the image.

12. The method of claim 11, wherein the applying correction includes replacing a background image behind the subject of interest with a neutral image.

* * * * *